United States Patent
Fedigan et al.

(10) Patent No.: US 6,667,597 B2
(45) Date of Patent: Dec. 23, 2003

(54) METHOD OF EXTENDING THE OPERATING SPEED RANGE OF A ROTOR FLUX BASED MRAS SPEED OBSERVER IN A THREE PHASE AC INDUCTION MOTOR

(75) Inventors: Stephen J. Fedigan, Dallas, TX (US); Charles P. Cole, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/256,656

(22) Filed: Sep. 27, 2002

(65) Prior Publication Data

US 2003/0117101 A1 Jun. 26, 2003

Related U.S. Application Data

(60) Provisional application No. 60/343,515, filed on Dec. 20, 2001.

(51) Int. Cl.[7] ................................................. H02P 5/34
(52) U.S. Cl. ........................ 318/800; 318/808; 318/801; 318/807
(58) Field of Search .................................. 318/808, 801, 318/800, 807, 701, 721, 809, 805, 803

(56) References Cited

U.S. PATENT DOCUMENTS

| | | | |
|---|---|---|---|
| 5,272,429 A | * | 12/1993 | Lipo et al. .................. 318/808 |
| 5,296,090 A | * | 3/1994 | Solares et al. ................. 216/87 |
| 5,376,800 A | * | 12/1994 | Solares et al. ............ 250/472.1 |
| 5,510,689 A | * | 4/1996 | Lipo et al. ................... 318/809 |
| 5,559,419 A | * | 9/1996 | Jansen et al. ................ 318/808 |

* cited by examiner

*Primary Examiner*—Karen Masih
(74) *Attorney, Agent, or Firm*—Robert D. Marshall, Jr.; W. James Brady, III; Frederick J. Telecky, Jr.

(57) ABSTRACT

A method of AC induction motor speed control employing a rotor flux based MRAS (Model Reference Adaptive System) speed observer. Rotor flux-based MRAS speed observers develop two independent rotor flux estimates. The reference rotor flux estimate is based on the currents and voltages in the stator windings, and the adaptive estimate is based on the stator currents and the measured or estimated rotor speed. These two estimates are compared by taking the cross product between them, and this error signal is passed into a proportional-integral (PI) controller, which adjusts the speed until the flux estimates agree with one another. While this method is well-established, the estimator poles become lightly damped at high speeds and prone to stability problems. In this invention, the upper speed range of the rotor flux-based MRAS speed observer is extended by discretely or continuously modifying the gain/bandwidth parameters of the low-pass filter in the adaptive flux estimator as a function of estimated speed.

12 Claims, 3 Drawing Sheets

US 6,667,597 B2

METHOD OF EXTENDING THE OPERATING SPEED RANGE OF A ROTOR FLUX BASED MRAS SPEED OBSERVER IN A THREE PHASE AC INDUCTION MOTOR

This application claims priority under 35 USC §119(e)(1) of Provisional Application No. 60/343,515, filed Dec. 20, 2001.

TECHNICAL FIELD OF THE INVENTION

The technical field of this invention is motor speed control and particularly using rotor flux based MRAS (Model Reference Adaptive System) speed observers.

BACKGROUND OF THE INVENTION

Electronic speed control of AC induction motors is well known in the art. Such AC induction motors are typically driven by selectively switching a DC voltage formed by rectifying an AC power source across the motor phase windings. An electronic controller including a microcontroller or digital signal processor (DSP) controls three phase switching of the DC voltage to produce a pulse width modulated three-phase AC input to the motor. It is feasible to employ speed feedback in these systems. Thus the electronic controller would compare an actual motor speed from a sensor with the command speed. This electronic controller would then continuously modify the drive to the AC induction motor to minimize any difference between the actual motor speed and the commanded motor speed.

A modification of this technique is the subject of this invention. Sensors that generate an electrical indication of motor speed such as tachometers are expensive and unreliable when compared with sensors for measuring electrical quantities such as voltage and current. Thus, speed observers such as rotor flux based model reference adaptive system speed observers are widely used. Rotor flux based model reference adaptive system speed observers employ electrical measurements of currents and voltages in the stator windings of the AC induction motor. The electronic controller employs these measures in a rotor flux estimator. The rotor flux estimate is employed both in generation of the motor drive control signals and in the rotor flux estimation.

A typical prior art system is illustrated in FIGS. 1 and 2. FIG. 1 illustrates the typical AC induction motor drive hardware 100 in block diagram form. AC induction motor drive hardware 100 includes high voltage module 110, electronic control module 120, AC induction motor 130 coupled to high voltage module 110 via three phase AC lines 135 and load 140 coupled to AC induction motor 130. High voltage module 110 includes all electronic parts that must handle high voltages. Alternating current (AC) line power supplied to rectifier/doubler 111 enables production of a direct current (DC) voltage used for induction motor drive. Switching module 113 is shown schematically in FIG. 1. Switching module 113 includes six high voltage semiconductor switches connected in three series pairs between the DC voltage and ground. The junction between each pair of semiconductor switches drives one phase of the three phase inputs 135 to induction motor 130. Predriver module 117 supplies switching signals to the six semiconductor switches. Current shunt module 115 includes a current shunt sensing resistor of resistance $R_{sense}$ in the ground path of each series pair of semiconductor switches. Signal conditioning module 119 receives the voltage across each of these resistors. The voltage across these sensing resistors corresponds to the current to ground from the corresponding semiconductor switch pair.

Electronic control module 120 provides the control function for AC induction motor drive hardware 100. Electronic control module 120 receives three analog input signals, ADC1, ADC2 and ADC3 from signal conditioning module 119. These three signals correspond to the voltage across the respective current shunt sensing resistor. Electronic control module 120 employs these input signals together with a speed command or other command input (not shown) to produce six switching signals PWM1, PWM2, PWM3, PWM4, PWM5 and PWM6. These six switching signals PWM1, PWM2, PWM3, PWM4, PWM5 and PWM6 are supplied to predriver module 117. Each of the six switching signals PWM1, PWM2, PWM3, PWM4, PWM5 and PWM6 provides control of the ON/OFF state of one of the six semiconductor switches of switching module 113. As known in the art, each of these signals provides a pulse width modulated drive to a corresponding one of the three phase drive lines 135 to induction motor 130.

FIG. 2 illustrates speed estimator algorithm 200 typically used in such rotor flux based model reference adaptive system (MRAS) speed observers. Speed estimator algorithm 200 forms two rotor flux estimates. Reference rotor flux estimator 201 forms rotor flux reference estimate $\lambda_r$ from stator voltage vector $v_s$ and stator current vector $i_s$. These two dimensional vectors having direct and quadrature components are derived from the stator voltages and currents of all three phases using the well-known Clarke transformation. It is understood that the rotor flux estimate is based upon the respective inputs for all three phases. Adaptive rotor flux estimator 202 forms adaptive rotor flux estimate $\lambda_a$ from the stator current $i_s$ and a motor speed estimate $\omega$. Error calculator 203 determines the difference between the reference rotor flux estimate $\lambda_r$ and the adaptive rotor flux estimate $\lambda_a$. The error signal e supplies a proportional/integral controller 204 which forms the motor speed estimate $\omega$. Motor speed estimate $\omega$ is compared with a commanded speed in a feedback loop. This drives a conventional pulse width modulation algorithm generating the six switching signals PWM1, PWM2, PWM3, PWM4, PWM5 and PWM6.

This rotor flux estimator method offers many advantages over a classic open loop speed observers. It does not involve any open loop integrators or differentiators. It is computationally simple. It does not require a separate slip speed calculation. However, this rotor flux estimator method is prone to stability problems, especially at high speeds.

FIG. 3 illustrates a typical adaptive rotor flux estimator algorithm 202. Gain blocks 301 and 302 receive respective stator currents $i_{sd}$ and $i_{sq}$. The output of gain block 301 supplies an additive input of summing junction 305. The output of summing junction 305 supplies low pass filter 309, which produces rotor flux estimate $\lambda_{ad}$. Similarly, the output of gain block 303 supplies an additive input of summing junction 307. The output of summing junction 307 supplies low pass filter 311, which produces rotor flux estimate $\lambda_{aq}$. Adaptive rotor flux estimator 202 includes two feedback paths. The rotor flux estimate $\lambda_{ad}$ supplies one input of multiplier 313. The other input of multiplier 313 receives the motor speed estimate $\omega$. The product output of multiplier 313 supplies a second, additive input of summing junction 307. The rotor flux estimate $\lambda_{aq}$ supplies one input of multiplier 315. The other input of multiplier 315 receives the motor speed estimate $\omega$. The product output of multiplier 315 supplies a second, subtractive input of summing junction 305.

Adaptive rotor flux estimator 202 is stable at low speeds where the feedback is near zero. At higher speeds, the cross-coupling becomes significant. The estimator poles become more and more lightly damped at higher speeds. At a sufficiently high speed, the additional phase lag in a digital implementation due to zero order hold reconstruction and processor time delay will cause instability.

SUMMARY OF THE INVENTION

A method of AC induction motor control known as rotor flux based model reference adaptive system. Model reference adaptive systems develop two estimates of rotor flux. The reference flux estimate is based on the voltages and currents in the stator windings. The so-called adaptive estimate is based on the stator currents and the measured or estimated operating speed. These two estimates are compared by taking the cross product between the reference and adaptive rotor fluxes and the estimated speed is adjusted by a proportional-integral controller until the estimator outputs agree. In this invention, the upper speed range of the rotor flux-based MRAS speed observer is extended by discretely or continuously modifying the gain/bandwidth parameters of the low-pass filter in the adaptive flux estimator as a function of estimated speed to increase the stability margin.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
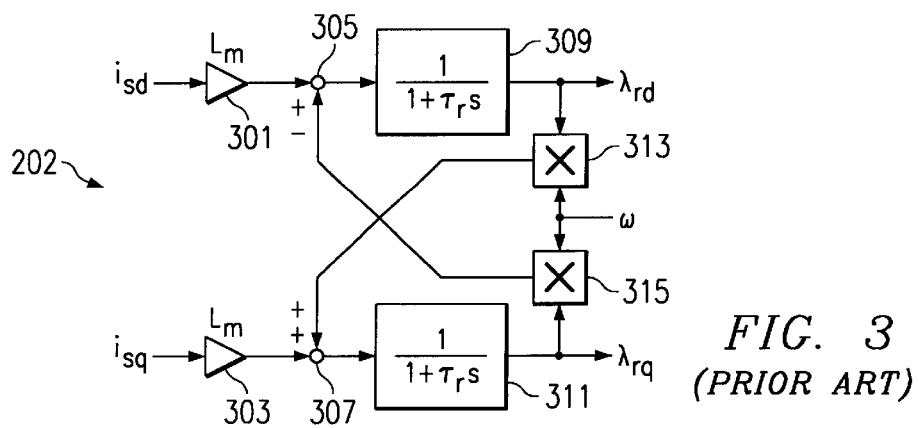
FIG. 3 illustrates the algorithm of the adaptive rotor flux estimator portion of the algorithm of FIG. 2.
Figure 4:
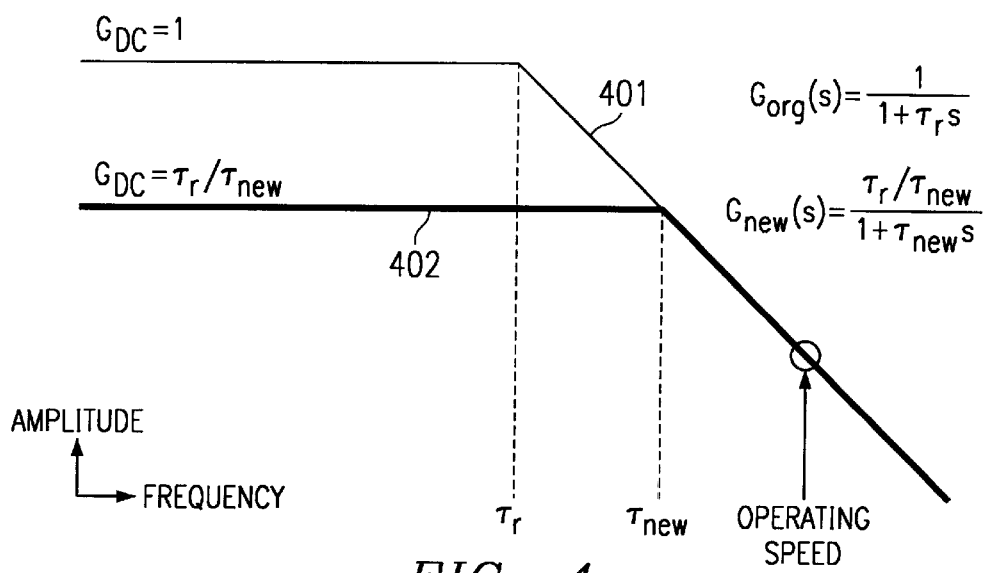
FIG. 4 illustrates a comparison of the gain/frequency characteristics of the prior art low pass filter and one example of an low pass filter of this invention.

FIG. 4 illustrates a comparison of the gain/frequency characteristics of low pass filters 309 and 311 and one example of an low pass filter of this invention. This invention solves the high speed stability problem of the prior art by modifying the dynamics of low pass filters 309 and 311. As shown in FIG. 3, low pass filters 309 and 311 of the prior art have a transfer function G(s) given by:

$$G(s) = \frac{1}{1 + \tau_r s}$$

This transfer function has a DC gain $G_{DC}=1$. This transfer function is shown at curve 401 of FIG. 4. The modified transfer function illustrated in curve 402 has a lower DC gain and a higher cutoff frequency $\tau_{new}$. The new transfer function $G_{new}(S)$ is given by:

$$G_{new}(s) = \frac{\tau_r/\tau_{new}}{1 + \tau_{new}s}$$

This transfer function has a DC gain $G_{DC}=\tau_r/\tau_{new}$. Note that these two changes to the transfer function result in that same filter characteristics in the region of the operating frequency which is higher than the original cutoff frequency $\tau_r$ and the new cutoff frequency $\tau_{new}$. This change preserves the original amplitude response in the region of the operating frequency. The higher cutoff frequency reduces the phase lag at the operating frequency corresponding to the estimated motor speed. This provides greater stability.

This solution comes at a price. The reduced gain and increased cutoff frequency creates amplitude and phase distortions at low frequencies corresponding to low motor speeds. These produce estimation errors at low frequencies.

Figure 1:
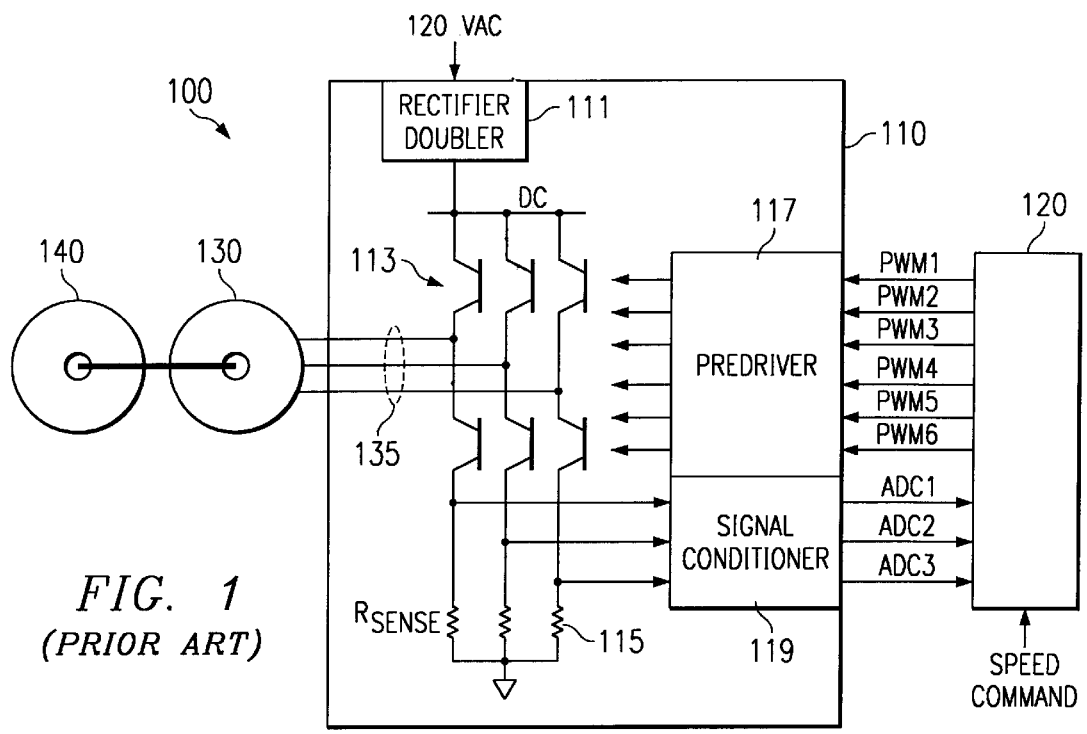
FIG. 1 illustrates the hardware of a prior art motor control system.
Figure 2:
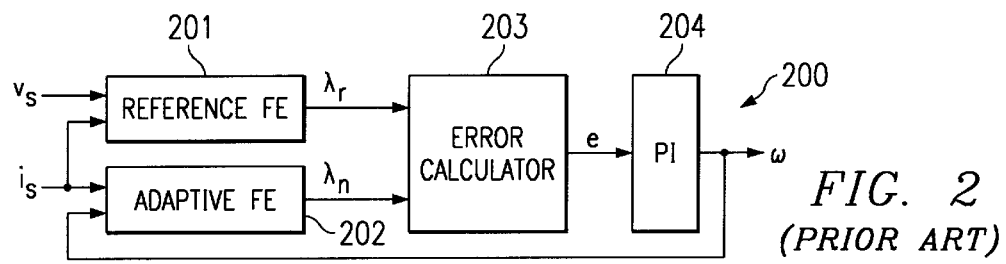
FIG. 2 illustrates the algorithm of a rotor flux estimator portion of a prior art rotor flux based model reference adaptive speed observer.
Figure 5:
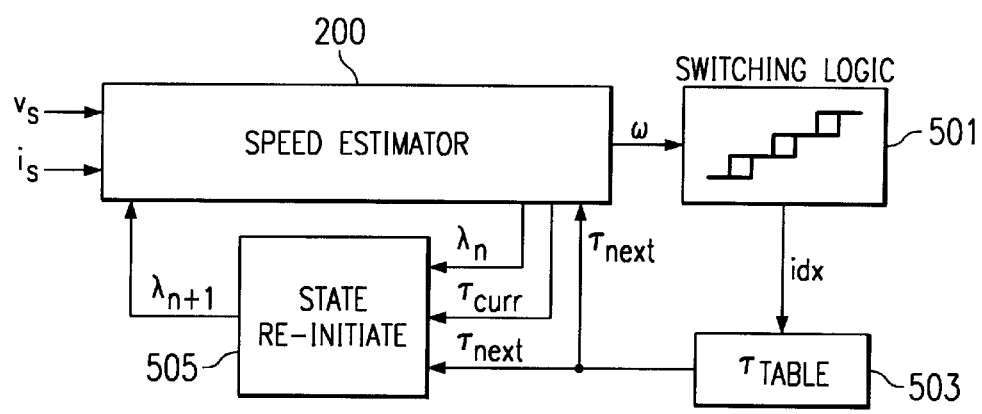
FIG. 5 illustrates an aspect of this invention involving switching between low pass filter characteristics dependent upon estimated motor speed.

FIG. 5 illustrates a switching system to combat this problem. This invention uses a series of modified low pass filter transfer functions based on estimated motor speed. Speed estimator algorithm 200 is illustrated in detail in FIG. 2. Speed estimator algorithm 200 receives the stator voltage $v_s$ and the stator current $i_s$ and generates a motor speed estimate ω. In addition to its other uses, motor speed estimate ω supplies switching logic 501. Switching logic 501 determines a frequency band for the received motor speed estimate ω. These frequency bands are preferably overlapping with hysteresis. This means that the upper limit frequency of one band is above the lower limit frequency of the next higher band. This hysteresis minimizes frequency band switching when near the frequency band boundaries. Switching logic 501 produces an index signal idx indicative of the current frequency band.

Switching logic 501 supplied this index signal idx to τ table 503. This τ table 503 stores the constants needed to implement one filter function per frequency band. In particular, when the index signal idx changes, τ table 503 outputs $\tau_{next}$. This τ table 503 supplies constant $\tau_{next}$ to speed estimator 200 and to state re-initializer 505. State re-initializer 505 also receives the rotor flux estimate $\lambda_n$ and the current constant $\tau_{current}$ from speed estimator 200. State re-initializer 505 generates a next rotor flux signal $\lambda_{n+1}$. This next rotor flux signal $\lambda_{n+1}$ is supplied to speed estimator 200 to set $\lambda_{n+1}=\lambda_n$. This avoids discontinuity in speed estimator 200. Such discontinuities could cause oscillations. This reinitialization and the frequency band hysteresis preserve stability in speed estimator 200. The low pass filter function switching enabled by switching logic 501 enables selection of low pass filter transfer characteristics selected for the current motor speed estimate ω.

Figure 7:
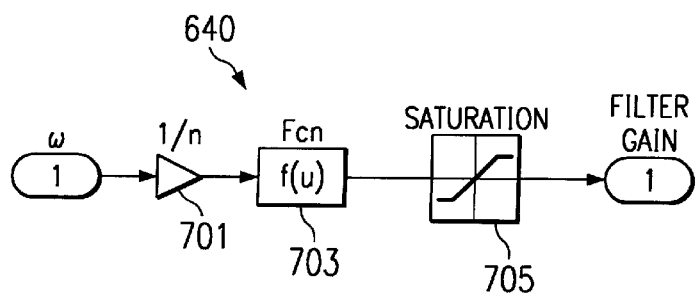
FIG. 7 illustrates the algorithm of the filter compensator generating filter gain from the estimated motor speed.
Figure 6:
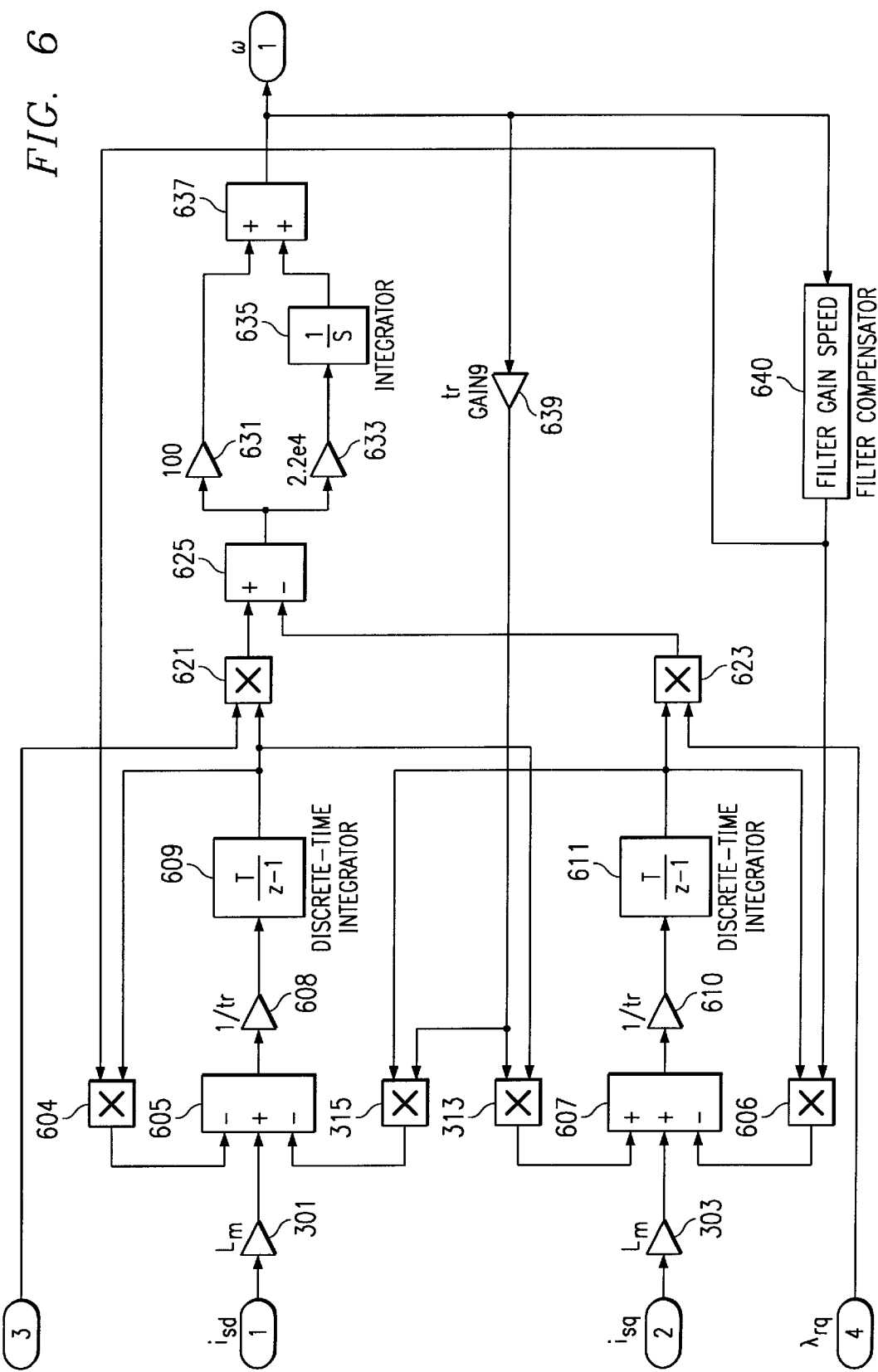
FIG. 6 illustrates the algorithm of a rotor flux based model reference adaptive speed observer of this invention employing continuously variable low pass filter characteristics based upon estimated motor speed.

FIGS. 6 and 7 illustrate another embodiment of this invention. FIGS. 6 and 7 show an algorithm employing a continuously variable gain in the adaptive rotor flux estimator 202 and proportional/integral controller 204. FIG. 6 illustrates a modified version of adaptive rotor flux estimator 202, together with error calculator 203 and proportional/integral controller 204. Adaptive rotor flux estimator 202 illustrated in FIG. 6 is similar to that illustrated in FIG. 3. Gain blocks 301 and 302 receive respective stator currents $i_{sd}$ and $i_{sq}$. The output of gain block 301 supplies an additive input of summing junction 605. Summing junction 605 differs from summing junction 305 by including an additional term. This will be further described below. The output of summing junction 605 supplies gain block 608 and discrete time integrator 609. These parts perform the function of low pass filter 309. Similarly, the output of gain block 303 supplies an additive input of summing junction 607.

Summing junction 607 includes another term not provided by summing junction 307. The output of summing junction 607 supplies gain block 610 and discrete time integrator 611, which perform the function of low pass filter 311. Adaptive rotor flux estimator 202 includes two feedback paths. The output of discrete time integrator 609 supplies one input of multiplier 313. The other input of multiplier 313 receives the motor speed estimate ω from gain block 639. The product output of multiplier 313 supplies a second, additive input of summing junction 607. The output of discrete time integrator 611 supplies one input of multiplier 315. The other input of multiplier 315 receives the motor speed estimate ω from gain block 639. The product output of multiplier 315 supplies a second, subtractive input of summing junction 607.

Error calculator 203 includes multipliers 621 and 623 and summing junction 625. Multiplier 621 receives the output of discrete time integrator 609 corresponding to rotor flux estimate $\lambda_{ad}$. Multiplier 621 receives a similar reference rotor flux estimate $\lambda_{rd}$ from reference rotor flux estimator 201 (FIG. 3). The product output supplies an additive input of summing junction 625. Multiplier 623 similarly multiplies rotor flux estimate $\lambda_{aq}$ from discrete time integrator 611 and reference rotor flux estimate $\lambda_{rq}$ from reference rotor flux estimator 201 (FIG. 3). The product output supplies a subtractive input of summing junction 625. The output of summing junction 625 is the error e shown in FIG. 2.

Proportional/integral controller 204 includes gain blocks 631 and 633, integrator 635 and summing junction 637. Gain block 631 receives the output of summing junction 625, which is the output of error calculator 203 and forms the proportional control term. The output of gain block 631 supplies one input to summing junction 637. Gain block 633 also receives the output of summing junction 625, which is the output of error calculator 203. Gain block 633 drives the input of integrator 635. Gain block 633 and integrator 635 form the integral control term. The output of integrator 635 supplies the second input of summing junction 637. The output of summing junction 637 corresponds to motor speed estimate ω. As previously described, motor speed estimate ω is coupled to one input of multipliers 313 and 315 via gain block 639.

FIG. 6 illustrates addition feedback of the motor speed estimate ω. Motor speed estimate ω is supplied to the input of filter compensator 640. Filter compensator 640 generates a filter gain output. This filter gain output supplies one input to multipliers 604 and 606. Multiplier 604 receives the output of discrete time integrator 609 at its second input. The product output of multiplier 604 supplies a subtractive input of summing junction 605. Multiplier 606 receives the output of discrete time integrator 611 at its second input. The product output of multiplier 606 supplies a subtractive input of summing junction 607. Thus the algorithm of FIG. 6 provides feedback in the adaptive rotor flux estimate dependent upon the motor speed estimate ω.

FIG. 7 illustrates the preferred embodiment of filter compensator 640. Filter compensator 640 includes gain block 701, function block 703 and saturation block 705. Filter block 703 preferably implements a quadratic function of the form:

$$f(u)=av^2+bv+c$$

where: v is the input; a, b and c are constants with a=0.0000577, b=0.0000547 and b=0.9221. Saturation block 705 limits the magnitude of the function gain introduced through multipliers 604 and 606 by limiting the filter gain output.

The system illustrated in FIGS. 6 and 7 is of a type commonly known as quadratic gain scheduling. This system implements the adjustments described in conjunction with FIG. 4 in continuous adjustments of the amplitude and cutoff frequency. This system avoids transients that could occur in switching between frequency bands.

In the preferred embodiment the control functions illustrated in FIGS. 2 to 7 are implemented in a programmed digital signal processor. This implementation is not the only manner of practicing the control functions of this invention. It is feasible to embody these control functions in an application specific integrated circuit (ASIC) employing either digital logic or analog elements. Those skilled in the control art would understand how to implement the disclosed control functions of this invention in any of these forms.

What is claimed is:

1. A method of AC induction motor control comprising the steps of:
    calculating a reference estimate of rotor flux from applied voltage and measured stator current;
    calculating an adaptive estimate of rotor flux from said measured stator current and a motor speed estimate;
    calculating an error from a cross product between the reference estimate of rotor flux and the adaptive estimate of rotor flux;
    calculating a motor speed estimate from said error;
    producing AC drive signals to the AC induction motor corresponding to the motor speed estimate; and
    wherein said step of calculating an adaptive estimate of rotor flux includes altering a cut off frequency and a DC gain of at least one low pass filter dependent upon said motor speed estimate.

2. The method of claim 1, wherein:
    each of said at least one low pass filter have a cut off frequency less than said motor speed estimate and a DC gain whereby an amplitude/frequency response of each of said at least one low pass filter is identical in a region around a current motor speed estimate for all alterations.

3. The method of claim 1, wherein:
    said step of altering a cut off frequency and a DC gain of said at least one low pass filter dependent upon said motor speed estimate includes
    determining a frequency band corresponding to a current motor speed estimate,
    selecting a filter parameter $\tau_{new}$ corresponding to said determined frequency band, and
    implementing at said at least one low pass filter a transfer function of $$G(s) = \frac{\tau_r/\tau_{new}}{1+\tau_{new}s}$$

where: $\tau_r$ is a predetermined constant.

4. The method of claim 3, wherein:
    said steps of calculating a reference estimate of rotor flux and calculating an adaptive estimate of rotor flux include re-initializing a next adaptive estimate of rotor flux to a prior adaptive estimate of rotor flux upon each change of $\tau_{new}$.

5. The method of claim 3, wherein:
    said step of determining a frequency band corresponding to a current motor speed estimate includes a hysteresis band whereby a highest frequency of a first frequency band is higher than a lowest frequency of a second next higher frequency band, said determined frequency band being a last determined frequency band if said motor speed estimate is between said lowest frequency of said second next higher frequency band and said highest frequency of said first frequency band.

6. The method of claim 1, wherein:
said step of altering a cut off frequency and a DC gain of said at least one low pass filter dependent upon said motor speed estimate includes continuously altering said cut off frequency and said DC gain of said at least one low pass filter dependent upon said motor speed estimate whereby an amplitude/frequency response of each of said at least one low pass filter remains unchanged in a region around a current motor speed estimate for all alterations.

7. An apparatus for motor drive control comprising:
a rectifier adapted for connection to an AC voltage source and producing a DC output voltage;
a three-phase voltage source inverter connected to said DC output voltage terminals of said rectifier and first, second and third phase output lines for supplying three-phase power, first, second and third current shunt resistors and a plurality of semiconductor switches connected to said DC output voltage, said first, second and third phase output line and connected to ground via said first, second and third current shunt resistors; and
a digital signal processor having first, second and third analog-to-digital inputs, each receiving a voltage at a corresponding first, second and third current shunt resistor, said digital signal processor programmed to calculate corrected instantaneous pulse width modulation drive signals for supply said plurality of semiconductor switches to produce a three phase motor drive at said first, second and third phase output lines, said digital signal processor programmed to
calculate a reference estimate of rotor flux from applied voltage and measured stator current,
calculate an adaptive estimate of rotor flux from said measured stator current and a motor speed estimate,
calculate an error from a cross product between the reference estimate of rotor flux and the adaptive estimate of rotor flux,
calculating a motor speed estimate from said error,
produce instantaneous pulse width modulation drive signals to supply said plurality of semiconductor switches to produce a three phase motor drive at said first, second and third phase output lines for an AC induction motor corresponding to the motor speed estimate, and
wherein said calculation of an adaptive estimate of rotor flux includes altering a cut off frequency and a DC gain of at least one low pass filter dependent upon said motor speed estimate.

8. The apparatus of claim 7, wherein:
said digital signal processor is programmed whereby
each of said at least one low pass filter have a cut off frequency less than said motor speed estimate and a DC gain whereby an amplitude/frequency response of each of said at least one low pass filter is identical in a region around a current motor speed estimate for all alterations.

9. The apparatus of claim 7, wherein:
said digital signal processor is programmed whereby
said alteration of a cut off frequency and a DC gain of said at least one low pass filter dependent upon said motor speed estimate includes
determining a frequency band corresponding to a current motor speed estimate,
selecting a filter parameter $\tau_{new}$ corresponding to said determined frequency band, and
implementing at said at least one low pass filter a transfer function of $$G(s) = \frac{\tau_r / \tau_{new}}{1 + \tau_{new} s}$$

where: $\tau_r$ is a predetermined constant.

10. The apparatus of claim 9, wherein:
said digital signal processor is programmed whereby
said calculation of a reference estimate of rotor flux and calculation of an adaptive estimate of rotor flux include re-initializing a next adaptive estimate of rotor flux to a prior adaptive estimate of rotor flux upon each change of $\tau_{new}$.

11. The apparatus of claim 9, wherein:
said digital signal processor is programmed whereby
said determination of a frequency band corresponding to a current motor speed estimate includes a hysteresis whereby a highest frequency of a first frequency band is higher than a lowest frequency of a second next higher frequency band, said determined frequency band being a last determined frequency band if said motor speed estimate is between said lowest frequency of said second next higher frequency band and said highest frequency of said first frequency band.

12. The apparatus of claim 7, wherein:
said digital signal processor is programmed whereby
said alteration of a cut off frequency and a DC gain of said at least one low pass filter dependent upon said motor speed estimate includes continuously alteration of said cut off frequency and said DC gain of said at least one low pass filter dependent upon said motor speed estimate whereby an amplitude/frequency response of each of said at least one low pass filter remains unchanged in a region around a current motor speed estimate for all alterations.

* * * * *